Figure 1:
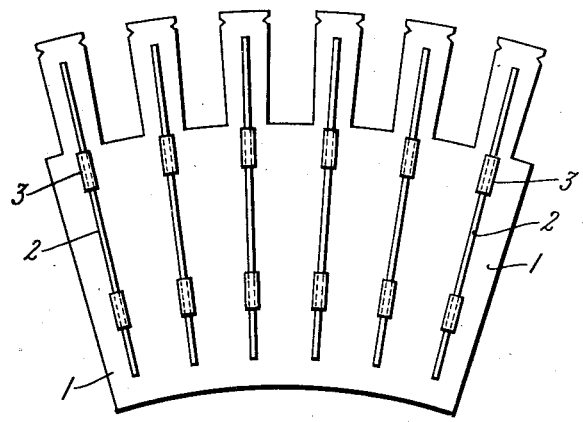

H. GEISENHÖNER.
SPACE BLOCK.
APPLICATION FILED JAN. 16, 1911.

1,083,822.

Patented Jan. 6, 1914.

Witnesses:
George W. Tilden
J. Ellis Glen.

Inventor:
Henry Geisenhöner,
by Albert G. Davis
His Attorney.

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

SPACE-BLOCK.

1,083,822. Specification of Letters Patent. Patented Jan. 6, 1914.

Application filed January 16, 1911. Serial No. 602,796.

*To all whom it may concern:*

Be it known that I, HENRY GEISENHÖNER, a citizen of the United States, residing at Schenectady, in the county of Schenectady, State of New York, have invented certain new and useful Improvements in Space-Blocks, of which the following is a specification.

The object of my invention is the provision of more efficient means for attaching space blocks to adjacent laminations in machines, more particularly the rotating parts of electrical machines.

Heretofore some difficulty has been experienced in attaching the space blocks to the laminations in such a manner that the space blocks remain in position under the various and varying strains to which they are subjected, as the centrifugal strain during rotation at high speeds. It has been found with very high speeds that the present practice of riveting these blocks to the laminations is not entirely satisfactory.

In the drawings which form a part of this specification, the reference numerals indicate the same parts in all the figures.

Figure 2:
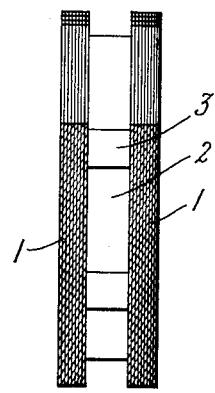
Figure 3:
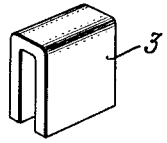
Figure 4:
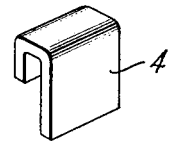
Figure 5:
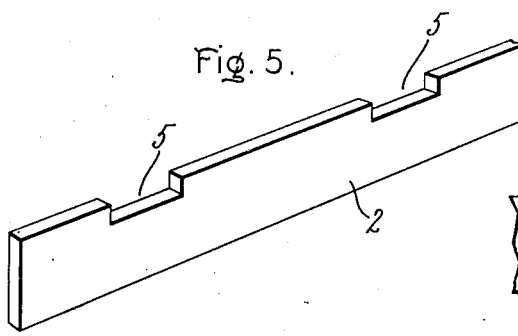
Figure 6:
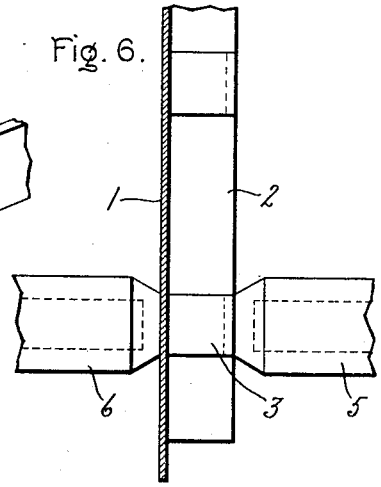

Figure 1 is an elevation of a lamination having space bars attached thereto. Fig. 2 is a sectional view showing a number of laminations and a space block therebetween. Figs. 3 and 4 show two forms of the clip. Fig. 5 is a perspective view of a space block. Fig. 6 is a view partly in section showing the method of welding the clip to the laminations.

1 is a plate to which it is desired to attach a block 2. In order to do this, I place a clip 3 over the block and weld the end or ends of the clip to the plate 1. The clip may have two legs of approximately the same length, as is shown in Fig. 3, but, in certain cases, one leg only of sufficient length to be welded to the plate 1 may be used; such a clip is shown at 4. When desirable, obviously a plurality of clips may be used engaging the same bar. It is undesirable for the clip to extend above the top edge of the bar 2. To prevent this and in order that the clip may firmly hold the bar in place, I cut in the bar, a notch 5 of the same width as the clip and of a depth equal to the thickness of the clip.

To weld the clip to the plate and thus attach the bar to the plate, it is convenient to place plate 1, bar 2 and clip 3 in position between the movable electrodes 6 of a welding machine. As the end or ends of the clip melts down, the electrodes 6 are moved toward each other and force the clip 3 down until it is completely seated in the notch 5 and securely welded to the plate 1. Any common or desired form of welding machine may be used wherein the electrodes are capable of moving together and exerting sufficient pressure.

In electrical machines having a rotating part, space blocks are used to separate the laminations at various points to provide ventilating spaces. It has some times been found difficult to so attach these space blocks to the laminations that they will resist a centrifugal strain during rotation at high speeds. My invention is particularly adapted to attaching these blocks, but, of course, is not limited to this one application.

What I claim as new, and desire to secure by Letters Patent of the United States, is:—

1. The combination of laminations, a space block therefor provided with a notch and a clip engaging in the notch and attached to one of the laminations.

2. In a dynamo-electric machine, the combination with laminations, of a space block therefor provided with a notch and a clip engaging in the notch and secured to one of the laminations on both sides of the block.

In witness whereof, I have hereunto set my hand this 14th day of January, 1911.

HENRY GEISENHÖNER.

Witnesses:
 BENJAMIN B. HULL,
 HELEN ORFORD.

Copies of this patent may be obtained for five cents each, by addressing the "Commissioner of Patents, Washington, D. C."